(12) United States Patent
Zhong et al.

(10) Patent No.: US 9,762,381 B2
(45) Date of Patent: *Sep. 12, 2017

(54) ADAPTATION OF CROSSING DFE TAP WEIGHT

(71) Applicant: NVIDIA CORPORATION, Santa Clara, CA (US)

(72) Inventors: Lizhi Zhong, Sunnyvale, CA (US); Vishnu Balan, Saratoga, CA (US); Gautam Bhatia, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,391

(22) Filed: Jul. 3, 2013

(65) Prior Publication Data

US 2015/0010047 A1 Jan. 8, 2015

(51) Int. Cl.
*H04L 7/00* (2006.01)
*H04L 25/03* (2006.01)
*H04L 7/033* (2006.01)

(52) U.S. Cl.
CPC .......... *H04L 7/0087* (2013.01); *H04L 7/0058* (2013.01); *H04L 25/03057* (2013.01); *H04L 7/0025* (2013.01); *H04L 7/033* (2013.01); *H04L 2025/03484* (2013.01); *H04L 2025/03605* (2013.01)

(58) Field of Classification Search
CPC .......... H04L 7/00; H04L 7/033; H04L 7/0087; H04L 7/0058; H04L 25/03057; H04L 2025/03484; H04L 2025/03605; H04L 7/0037; H04L 7/0025; H03L 7/091
USPC ....... 375/232–234, 316, 340, 346, 350, 371, 375/375
See application file for complete search history.

(56) References Cited

U.S. PATENT DOCUMENTS

| 5,436,937 | A | 7/1995 | Brown et al. |
| 6,400,291 | B1 | 6/2002 | Sankey |
| 8,259,890 | B2 | 9/2012 | Chenk et al. |
| 8,681,839 | B2 | 3/2014 | Bulzacchelli et al. |
| 8,791,735 | B1 * | 7/2014 | Shibasaki ............. H03L 7/0812 327/147 |
| 9,184,907 | B2 | 11/2015 | Mills et al. |
| 9,231,802 | B2 | 1/2016 | Zhong et al. |
| 2004/0091064 | A1 | 5/2004 | Cao et al. |
| 2004/0091073 | A1 | 5/2004 | Smith et al. |

(Continued)

FOREIGN PATENT DOCUMENTS

| CN | 201228304 | 4/2009 |
| CN | 101595699 | 12/2009 |

*Primary Examiner* — Khanh C Tran

(57) ABSTRACT

A method comprises receiving an input signal at an input of a receiver and retrieving a data sample signal and an error sample signal from the input signal. The method also comprises applying an adaptive procedure to generate a feedback code using the data sample signal and the error sample signal for feeding back into a decision feedback equalization (DFE) module. Further, it comprises converting the feedback code into a corresponding voltage value and assigning the corresponding voltage value as a tap weight for the DFE module. Finally, it comprises generating an edge sample signal by applying DFE to the input signal using the DFE module, wherein the DFE is based on the tap weight.

23 Claims, 13 Drawing Sheets

(56) References Cited

U.S. PATENT DOCUMENTS

| | | |
|---|---|---|
| 2004/0202266 A1 | 10/2004 | Gregorius |
| 2005/0180536 A1* | 8/2005 | Payne et al. .................. 375/354 |
| 2006/0114069 A1 | 6/2006 | Kojima et al. |
| 2006/0158262 A1 | 7/2006 | Robinson et al. |
| 2008/0056344 A1 | 3/2008 | Hidaka |
| 2009/0296867 A1 | 12/2009 | Do et al. |
| 2010/0103999 A1 | 4/2010 | Leibowitz |
| 2011/0243215 A1* | 10/2011 | Wu et al. ...................... 375/233 |
| 2012/0033773 A1 | 2/2012 | Nedovic |
| 2012/0106539 A1 | 5/2012 | Ferraiolo |
| 2012/0106687 A1 | 5/2012 | Bulzacchelli |
| 2012/0128055 A1* | 5/2012 | Jiang ............................. 375/233 |
| 2012/0151247 A1 | 6/2012 | Ferraiolo |
| 2012/0250811 A1 | 10/2012 | Misek et al. |
| 2013/0070882 A1 | 3/2013 | Nedovic |
| 2013/0154698 A1* | 6/2013 | Bottelli et al. ................ 327/157 |
| 2013/0249612 A1 | 9/2013 | Zerbe |
| 2014/0016692 A1* | 1/2014 | Leibowitz et al. ........... 375/233 |
| 2014/0177693 A1 | 6/2014 | Zhong et al. |
| 2014/0185633 A1 | 7/2014 | Mills et al. |

\* cited by examiner

| $x_k$ | $d_{k-1}$ | $d_k$ | Delta Phase | $x_k \cdot d_{k-1}$ |
|---|---|---|---|---|
| -1 | -1 | 1 | -1 | -1 |
| -1 | -1 | 1 | 1 | 1 |
| -1 | 1 | -1 | 1 | 1 |
| -1 | 1 | -1 | -1 | -1 |
| -1 | 1 | 1 | 0 | -1 |
| -1 | -1 | 1 | -1 | -1 |
| -1 | -1 | -1 | -1 | -1 |
| -1 | -1 | -1 | 0 | 1 |

FIG. 5

ADAPTATION OF CROSSING DFE TAP WEIGHT

CROSS-REFERENCE TO RELATED APPLICATIONS

This application is related to patent applications: "INFLUENCE CLOCK DATA RECOVERY SETTLING POINT BY APPLYING DECISION FEEDBACK EQUALIZATION TO A CROSSING SAMPLE," filed on Dec. 26, 2012, Ser. No. 13/727,442, which is herein incorporated by reference in their entirety.

BACKGROUND OF THE INVENTION

Often times high-speed serial data streams are sent without an accompanying clock signal. Clock and data recovery (CDR) methods allow for a receiver to generate a clock from an approximate frequency reference. As input/output speeds become higher, the data sampling point used by CDR becomes increasingly critical to the link performance. The sampling point is typically determined by bang-bang CDR, where the settling point may not be where the vertical eye opening is largest or at the middle of the eye. As a result, the sampling point may not be optimal and signal integrity issues may arise.

BRIEF SUMMARY OF THE INVENTION

Accordingly, a need exists for an apparatus and method to manipulate the CDR settling point to in an effort achieve an optimum sampling phase. Embodiments of the present invention disclose an apparatus and method for influencing a clock and data recovery settling point (CDR settling point) of a data sampling phase signal by applying decision feedback equalization (DFE) on an input signal to produce a DFE output signal which is fed to a sampler which is clocked by the edge sample recovery clock. The sampler produces an edge sample signal. The edge sample signal is then used to influence the CDR settling point of a data sampling phase signal. Further, since the DFE is applied to the edge sample signal, also known as the "zero crossing" signal, the DFE tap weight may be adapted for different interfaces or channels in order to influence the CDR settling point of the data sampling phase signal. The tap weight is adapted by feeding a data sample signal and an error sample signal derived from the input signal into an adaptation loop that determines the feedback code for feeding back into the DFE module.

In one embodiment, the present invention is drawn towards a method. The method comprises retrieving a data sample signal and an error sample signal from an input signal. The method also comprises applying an adaptive procedure to generate a feedback code using the data sample signal and the error sample signal for feeding back into the DFE module. Further, it comprises converting the feedback code into a corresponding voltage value and assigning the corresponding voltage value as a tap weight for the DFE module. Finally, it comprises generating an edge sample signal by applying DFE to the input signal using the DFE module, wherein the DFE is based on the tap weight.

In another embodiment, the present invention is draw towards a method comprising applying decision feedback equalization (DFE) to an input signal in accordance with an initial tap weight value assigned to a DFE module to generate an edge sample signal. It also comprises using the edge sample signal to influence a settling point of a data sample signal. Further, it comprises varying a DFE tap weight from the initial tap weight value across a range of values and tracking respective settling points for the data sample signal associated with the range of values. Finally, it comprises selecting a value for the DFE tap weight from the range of values.

In another embodiment, the present invention is drawn towards a circuit. The circuit comprises a decision feedback equalization (DFE) module operable to receive an input signal and further operable to employ DFE on the input signal to generate an edge sample signal therefrom, wherein the DFE is based on an initial tap weight for the DFE module. The circuit also comprises a timing recovery module coupled to the DFE module and operable to receive the edge sample signal, and further operable to generate a data sampling phase signal based on the edge sample signal, wherein the data sampling phase signal converges to a clock and data recovery (CDR) settling point. Finally, it comprises an adaptation module operable to vary a DFE tap weight from the initial tap weight value across a range of values and tracking respective CDR settling points associated with the range of values and further operable to select a value for the DFE tap weight from the range of values.

In another embodiment, the present invention is drawn to a circuit comprising a first branch operable to generate an error sample signal from an input signal and a second branch operable to generate a data sample signal from the input signal. It also comprises a decision feedback equalization (DFE) module operable to receive the input signal and further operable to employ DFE on the input signal to generate an edge sample signal therefrom, wherein the DFE is based on a tap weight for the DFE module. Further, it comprises an adaptation module operable to apply an adaptive procedure using the data sample signal and the error sample signal to generate a feedback code. The DFE module comprises a feedback block operable to convert the feedback code into a corresponding voltage value and further operable to use the corresponding voltage value as a tap weight for the DFE module.

BRIEF DESCRIPTION OF THE DRAWINGS

The embodiments of the present invention are illustrated by way of example, and not by way of limitation, in the figures of the accompanying drawings and in which like reference numerals refer to similar elements.

FIG. 5 shows a truth table used by a phase detector, in accordance with one embodiment of the present invention.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
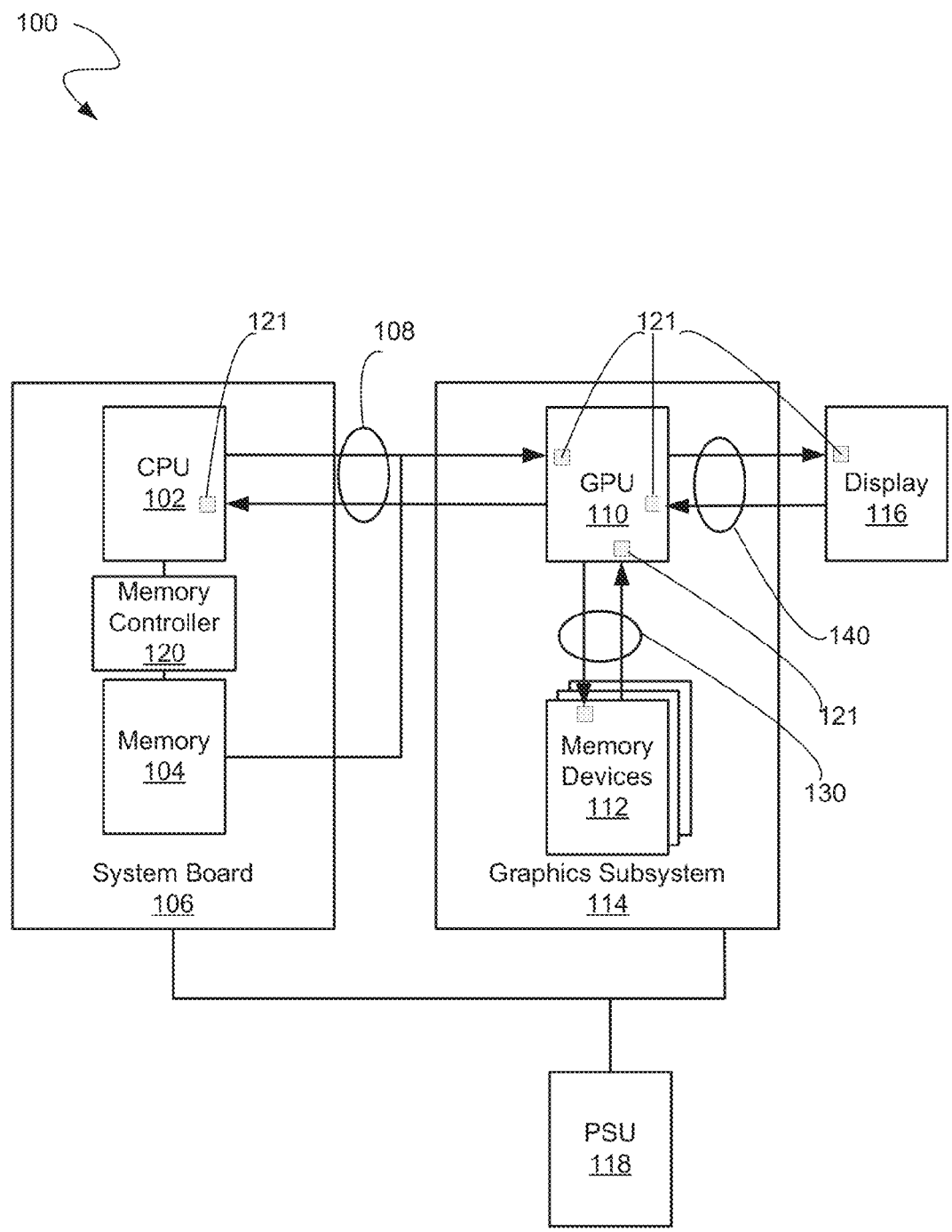
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software-based functionality, in particular, computer graphics rendering and display capability. In general, computer system 100 comprises a system board 106 including at least one central processing unit (CPU) 102 and a system memory 104. The CPU 102 can be coupled to the system memory 104 via a memory controller 120. In an embodiment, system memory 104 may be DDR3 SDRAM.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented and other types of processors (e.g., general purpose or other special-purpose coprocessors) or within a CPU.

System board 106 also includes a receiver device 121, in accordance with embodiments of the present invention, which may be placed on any communication link at the receiver end. As shown, receivers 121 are placed on the receiver ends of bidirectional communication link 108 (between CPU 102 and GPU 110) and communication link 130 (between GPU 110 and memory) and communication link 140 (between GPU 110 and the display). It is appreciated that these communication links are exemplary. Communication device 121 is operable to receive data (See FIG. 2). The receiver may be either local or remote to system 100.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Adaptation of Crossing DFE Tap Weight

Figure 2:
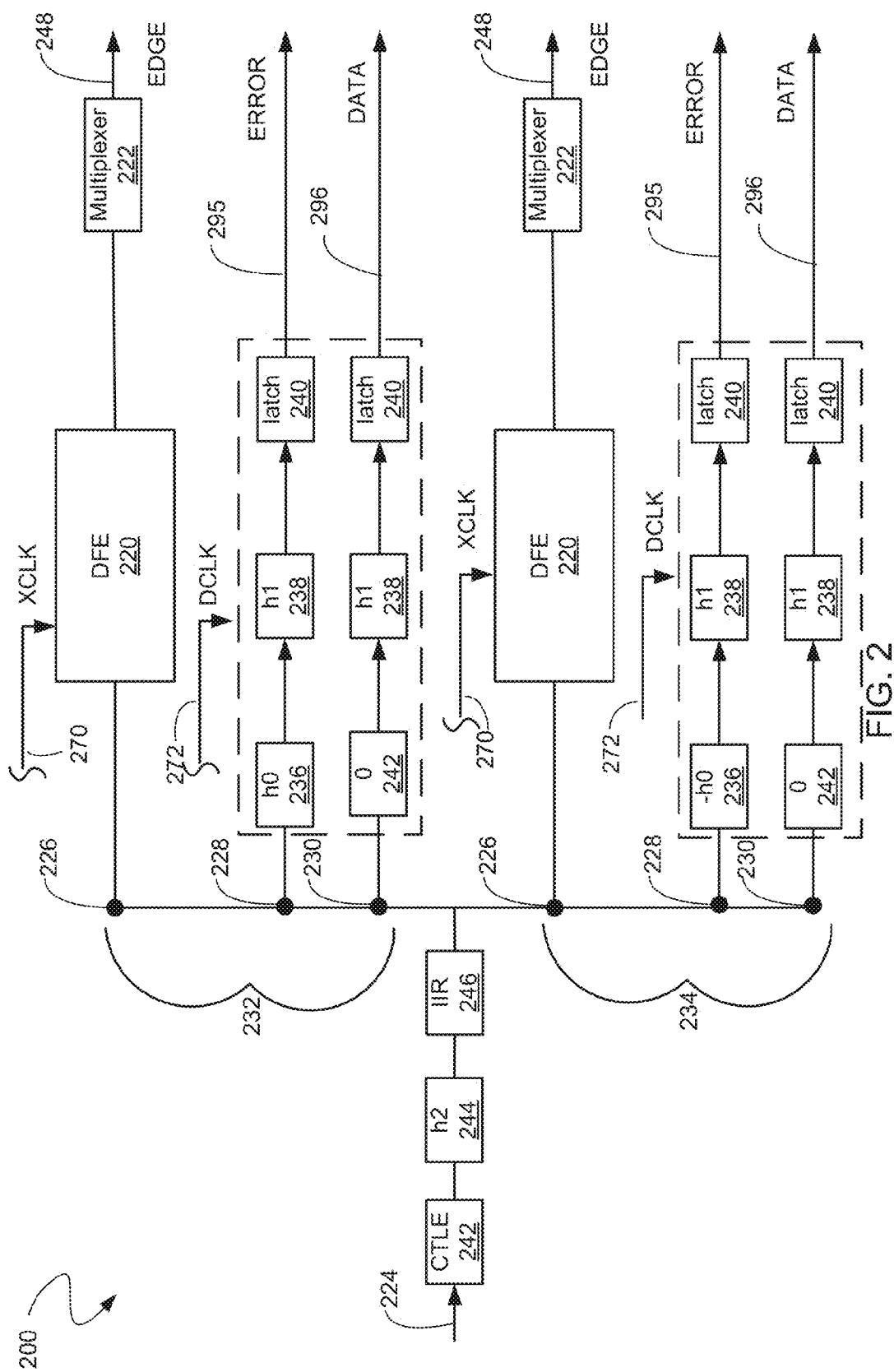
FIG. 2 shows an exemplary receiver, in accordance with one embodiment of the present invention in applying DFE techniques to an input signal to recover an edge sample signal.

FIG. 2 shows an exemplary communication receiver 200, in accordance with one embodiment of the present invention. Receiver 200 is operable to receive an input signal 224.

Typically, input signal 224 may be generated and transmitted via a transmitter (not shown). The transmitter may be remote or local.

Receiver 200 comprises a first circuit branch 226, second circuit branch 228, and a third circuit branch 230. Branch 226 is clocked by an x_clock signal 270. The x_clock signal 270 is the signal used to recover the edge sample signal 248. Branches 228 and 230 are clocked by the d_clock signal 272 which is used to recover the data sample signal and the error sample signal. In an embodiment, receiver 200 may comprise an odd path 232 and an even path 234, wherein both odd path 232 and even path 234 each comprise first circuit branch 226, second circuit branch 228 and third circuit branch 230. Both odd path 232 and even path 234 may simultaneously process a signal while odd path 232 operates on data of a first clock cycle and even path 234 operates on data of a second clock cycle.

It is appreciated that first circuit branch 226 comprises a decision feedback equalization (DFE) block 220 coupled to a multiplexer 222. DFE block 220 is operable to apply DFE techniques to an input signal 224. Upon applying DFE to input signal 224, a DFE output is generated which is then sampled according to a sampler clocked by the x_clock 270, the result of this signal is then multiplexed via multiplexer 222 to produce an edge sample signal 248. Multiplexer 222 selects a single signal out of two or more outputs of DFE block 220.

Figure 4:
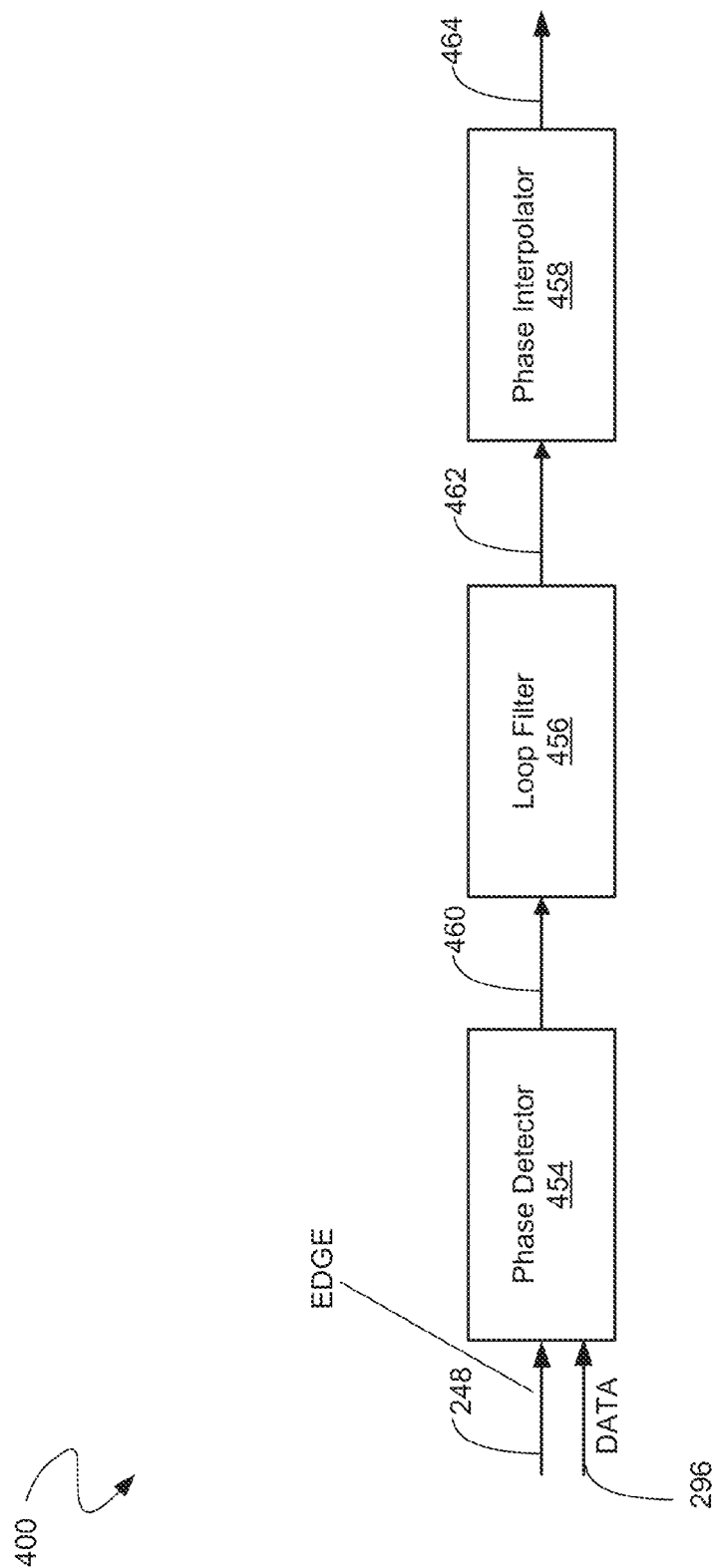
FIG. 4 shows an exemplary timing recovery module, in accordance with one embodiment of the present invention.

The edge sample signal 248 is then transmitted to and used by a timing recovery module (See FIG. 4). The generated edge sample signal is then used to influence a clock and data recovery (CDR) settling point, described further below.

Second circuit branch 228, receives the d_clock 272 and comprises an h0 constant block 236, an h1 feedback block 238 (based on a prior received data bit), and a latch 240. Second circuit branch 228 is operable to generate an error sample signal 295 based on the input signal 224. In an embodiment, h0 constant block 236 is subtracted from its incoming signal. In another embodiment, h0 constant block 236 is added to the incoming signal.

Third circuit branch 230 receives the d_clock 272 and comprises a buffer 242, h1 feedback block 238 (based on a prior received data bit), and a latch 240. Third circuit branch 230 is operable to generate a data sample signal 296 based on the input signal 224.

In an embodiment, receiver 200 may also comprise a continuous time linear equalizer (CTLE) 242, h2 feedback 244, and an infinite impulse response (IIR) filter 246. CTLE 242, h2 244, and IRR 246 may be applied to input signal 224 prior to splitting input signal 224 into first circuit branch 226, second circuit branch 228, and third circuit branch 230. CTLE 242 is configured to shape an input pulse response to compensate for feedback from the DFE.

Figures 3A, 3B, 3C:
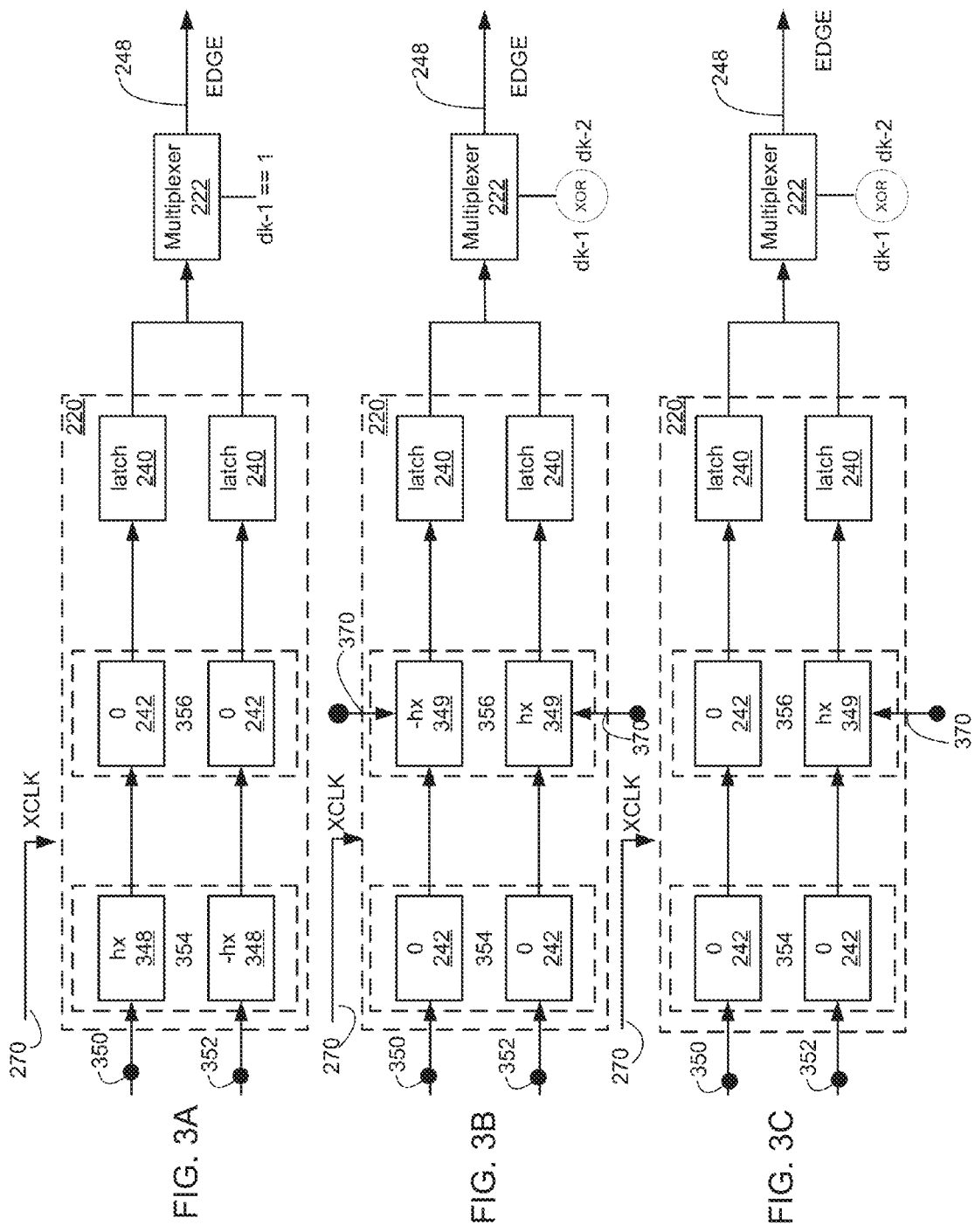
FIG. 3A shows an exemplary DFE block comprising constant offset blocks, buffers, and latches, in accordance with one embodiment of the present invention.
FIG. 3B shows an exemplary DFE block comprising a constant offset block, a feedback block, and a latch, in accordance with one embodiment of the present invention.
FIG. 3C shows an exemplary DFE block comprising a constant offset block, a feedback block, and a latch, in accordance with one embodiment of the present invention.

FIG. 3A shows an exemplary DFE block 220, which receives the x_clock 270, and comprises constant hx offset blocks 348, buffers 242, and latches 240, in accordance with one embodiment of the present invention. FIG. 3A is depicted as a shorthand block diagram of expressing the processing on the input signal to arrive at the edge sample signal 248. DFE block 220 applies DFE techniques to input signal 224 (FIG. 2). DFE block 220 comprises a first path 350 and a second path 352.

DFE block 220 offsets the input signal during a constant column 354 and applies feedback to the input signal during a feedback column 356.

First path 350 and second path 352 receive the input signal. In the constant column 354, first path 350 applies a +hx constant offset 348 (subtraction) to the input signal, operable to offset (reduce) the input signal by a predetermined constant value. The input signal may be offset by a positive constant value or a negative constant value. In this case, hx may be 5 mV and the processed input signal may be offset (reduced) by 5 mV. In the constant column 354, second path 352 applies a −hx constant offset 348 to the input signal, operable to offset (reduce) the input signal by a predetermined value. In this case, hx may be −5 mV and the input signal may be offset (reduced) by −5 mV thereby adding 5 mV.

During the feedback column 356, neither first path 350 nor second path 352 apply any feedback to the signal in the embodiment shown in FIG. 3A. Rather, buffer 242 stalls the signal for a predetermined amount of time or simply passes the signal through. In other embodiments, as will be discussed below, the tap weight for the DFE block 220 can be adapted by changing the configuration of the blocks in feedback column 356. By adapting the tap weight, the CDR settling point of the data sampling phase signal can be adjusted.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to one if a prior data value (dk−1) is equal to 1. In this case, first path 350 will be selected by the multiplexer 222 and will be output as the edge signal 248. Otherwise, if a prior data value (dk−1) is not equal to 1, second path 352 will be selected by the multiplexer 222 and will be output as the edge signal 248.

FIG. 3B shows an exemplary DFE block 220, receiving the x_clock signal 270, and comprising adaptive hx feedback blocks 349, buffers 242, and latches 240, in accordance with one embodiment of the present invention. FIG. 3B is depicted as a shorthand method of expressing the processing on the input signal. DFE block 220 applies DFE techniques to input signal 224 (FIG. 2). DFE block 220 comprises a first path 350 and a second path 352.

DFE block 220 offsets the signal during a constant column 354 and applies feedback to the signal during a feedback column 356.

First path 350 and second path 352 receive the input signal. During the constant column 354, neither first path 350 nor second path 352 apply any constant offset to the signal. Rather, buffers 242 stall the signal for a predetermined amount of time or simply pass the signal through.

During the feedback column 356, first path 350 applies a −hx feedback 349 to the signal, thereby applying DFE techniques to the signal. Second path 352 applies a hx feedback 349 to the signal. In one embodiment, both −hx and hx feedback 349 are feedbacks based on a feedback code obtained using data sample signal 296 (FIG. 2) and error sample signal 295 (FIG. 2) in conjunction with an adaptation module. As discussed in further details below, the hx feedback is a DFE tap weight that in one embodiment can be adapted automatically for different interfaces or channels. Both the −hx and hx feedback blocks 349 receive the feedback from the adaptation module using data sample signal 296 and error sample signal 295 through feedback inputs 370. In one embodiment, the feedback −hx 349 for first path 350 can be a different value from the feedback hx 349 for second path 352.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to the result of an exclusive OR operation with a first and a second prior data values. In this case, first path 350 will be selected by the multiplexer 222 and will be output as the edge signal 248 if the result of the exclusive OR operation is 1. Otherwise, if the result of the exclusive OR operation is zero, second path 352 will be selected by the multiplexer 222 and will be output as the edge signal 248.

FIG. 3C shows an exemplary DFE block 220, receiving the x_clock signal 270 and comprising a buffer 242, hx feedback 349, and latches 240, in accordance with one embodiment of the present invention. FIG. 3C is depicted as a shorthand method of expressing the processing on the input signal. DFE block 220 applies DFE techniques to input signal 224 (FIG. 2). DFE block 220 comprises a first path 350 and a second path 352.

DFE block 220 offsets the signal during a constant column 354 and applies feedback to the input signal during a feedback column 356.

First path 350 and second path 352 receive the signal. During the constant column 354, neither first path 350 nor second path 352 apply any constant offset to the signal. Rather, buffers 242 stall the signal for a predetermined amount of time.

During the feedback column 356, first path 350 uses buffer 242 to stall the signal or simply pass the signal through, thereby applying no feedback to the signal. Second path 352 applies a hx feedback 349 to the signal, thereby applying DFE techniques to the signal. The hx feedback 349 is feedback based on a feedback code obtained using a data sample signal 296 (FIG. 2) and error sample signal 295 (FIG. 2) in conjunction with an adaptation module. As discussed in further details below, the hx feedback 349 is a DFE tap weight that in one embodiment can be adapted automatically for different interfaces or channels. The hx feedback block 349 receives the feedback from the adaptation module using data sample signal 296 and error sample signal 295 through feedback input 370.

Latches 240 are operable to sample the signal and store its value prior to multiplexer 222 selecting either the output of latch 240 from first path 350 or second path 352. Multiplexer 222 selects either an output between first path 350 or second path 352 based on logic attributed to its select line. In this particular embodiment, a select value of multiplexer 222 will be equal to the result of an exclusive OR operation with a first and a second prior data values. In this case, first path 350 will be selected by the multiplexer 222 and will be output as the edge signal 248 if the result of the exclusive OR operation is 1. Otherwise, if the result of the exclusive OR operation is zero, second path 352 will be selected by the multiplexer 222 and will be output as the edge signal 248.

FIG. 3A, FIG. 3B, and FIG. 3C demonstrate three exemplary embodiments of SFE block 220 in accordance with the present invention. Typical latch 240 input is:

$$r(t) = \sum_{i=-\infty}^{\infty} (d_i \cdot g(t - i \cdot T) \otimes h(t)) = \sum_{i=-\infty}^{\infty} (d_i \cdot p(t - i \cdot T))$$

Where p(t) is the equalized pulse response at the latch input. It includes the circuit branch and the equalizers at both a transmitter and the receiver 200 (CTLE, DFE, IIR, etc.).

The latch 240 samples are obtained by sampling latch 240 input at a data or crossing sampling phase, given by the following Equation 3:

$$r_{k-\delta} = r(t)|_{t=(k-\delta)\cdot T - \tau_k} = \sum_{i=-\infty}^{\infty} (d_i \cdot p((k-\delta-i)\cdot T - \tau_k))$$
$$= \sum_{i=-\infty}^{\infty} (d_i \cdot P_{k-\delta-i}^{k}) = \sum_{j=-\infty}^{\infty} (d_{k-j} \cdot P_{j-\delta}^{k}) = \sum_{i=-\infty}^{\infty} (d_{k-j} \cdot P_{j-\delta})$$ (3)

Here $\tau_k$ is the data sampling phase at the kth symbol, $\delta$ is the IQ offset (in the unit of UI). For data samples, $\delta=0$. When the CDR changes the data sampling $\tau_k$, the samples of pulse response $P_{j-\delta}^{k}$ change with it. When the CDR moves left, $p_1$ increases and $p_{-1}$ decreases even for the same latch.

The closed form expression of the latch sample derived is the foundation of the analysis of the CDR settling point. It also the basis of the equalizer design.

Taking DEE as an example, without DFE the data latch sample can be obtained by equation (3) by setting $\delta=0$, $$r_k = \sum_{j=-\infty}^{\infty} d_{k-j} \cdot p_j$$

From the expression it is clear that there exists intersymbol interference (ISI) from the data symbols both in the past and the future. By using DFE with N taps, one can reduce the ISI in the data latch sample. When $h_j=p_j$, the residual ISI from the corresponding data symbol can be eliminated. Here, $p_j$ is the pulse response sample at the DFE input.

$$r_k - \sum_{i=1}^{N} (h_i \cdot d_{k-i}) = $$
$$\sum_{j=-\infty}^{-1} d_{k-j} \cdot p_j + p_0 \cdot d_k + \sum_{j=1}^{N} (p_j - h_j) \cdot d_{k-j} + \sum_{j=N+1}^{\infty} d_{k-j} \cdot p_j$$

For crossing latch samples, there also exists ISI from the data symbols both in the past and in the future. This is apparent from equation (3) above. One should note that the interferences are from the data symbols, not from other crossing latch outputs. The pulse response samples $p_{j-\delta}$ will be obtained at the sampling points of the cross latch, rather than that of the data latch. For example, if $\delta=0.4$ the crossing ISI is $$r_{k-0.4} = \ldots + p_{-0.4} \cdot d_k + p_{0.6} \cdot d_{k-1} + d_{k-2} + \ldots$$

However, reducing the crossing ISI does not have direct impact on the data latch output or even the zero crossings of the data latch input eye. Hence what matters to the data latch is how the CDR settling point is impacted by the ISI in the crossing latch samples.

FIG. 4 shows an exemplary timing recovery module 400, in accordance with one embodiment of the present invention. Timing recovery module 400 is coupled to receiver 200 (FIG. 2) and receives edge sample signal 248 from receiver 200 (FIG. 2) and also receives the data sample signal 296. Timing recovery module 400 includes phase detector 454, loop filter 456, and phase interpolator 458.

Phase detector 454 receives edge sample signal 248 and data signals 296 from receiver 200 (FIG. 2). Data signals 296 include a current data value and a prior data value. Phase detector 454 is operable to generate a plurality of delta phases 460 based on the received edge signal 248, a current data value, and a prior data value, wherein both current and prior data values are obtained from data sample signal 296.

Loop filter 456 is coupled to phase detector 454. Loop filter 456 receives the delta phases 460 generated by phase detector 454 and averages the delta phases 460 to generate a phase code 462. Loop filter 456 inherently functions as an adder, accumulator, and loop gain control.

Phase interpolator 458 is coupled to loop filter 456 and receives the phase code 462 generated by loop filter 456. Phase interpolator 458 interpolates the phase code 462 based upon values contained within a lookup table and generates a data sampling phase 464 therefrom. Data sampling phase 464 settles at a point to become the clock and data recovery settling point (CRD settling point). Thus, effectively, the edge sample signal influences the clock and data recovery settling point of the data sampling phase 464 in accordance with embodiments of the present invention.

Bang-bang CDR adjusts the phase based on the triplet ($d_k$, $x_k$, $d_{k-1}$) where $x_k$ is the crossing latch output with a sampling phase between that of $d_{k-1}$ and $d_k$. From the truth table (See FIG. 5), it is appreciated that bang-bang CDR is equivalent to the sign-sign version of a one-tap edge equalizer. It follows that what bang-bang CDR attempts to do is to adjust the sampling phase such that the term related to $d_{k-1}$ (the first crossing ISI tap) is minimized.

FIG. 5 shows a truth table 500 used by a phase detector 454 (FIG. 4), in accordance with one embodiment of the present invention. Truth table 500 is used by phase detector 454 (FIG. 4) in determining the delta phases as a function of the edge signal 248 (FIG. 2), a current data value ($d_k$), and a prior data value ($d_{k-1}$). Truth table 500 may be stored within memory 104 (FIG. 1) of system 100 (FIG. 1).

Timing recovery module 400 demonstrates a typical CDR loop. A first order CDR loop filter consists of two stages. The first stage of the loop filter provides a constant divide ratio or proportional gain $\mu$. The divide ratio is large enough (or $\mu$ is small enough) that $(\Sigma \mu \cdot x_k \cdot d_{k-1}) \sim E[x_k \cdot d_{k-1}]$. The accumulation in the formula is achieved by the phase integrator in the $2^{nd}$ stage of the loop filter, which increments the phase code by 1 (or a fixed step size) or decrements it by 1 based on the output of the first stage.

To facilitate the analysis of the CDR settling point, the phase detector is replaced with equivalent gradient $x_k \cdot d_{k-}$. When the long term average of $x_k \cdot d_{k-1}$ is 0, the phase code will not change or simply dither between two adjacent values, Consequently, the CDR phase settles to where the long term average of $x_k \cdot d_{k-1}$ is 0.

Building on equation (3) and the relationship between CDR and equalizer, we can derive a closed-form expression for the CDR settling point. It follows from equation (3) that when there is a transition between the current data symbol and the previous one, $$r_{k-\delta} \cdot d_{k-1} \mid_{d_k = -d_{k-1}} = \sum_{j=-\infty}^{\infty} (d_{k-j} \cdot p_{j-\delta}) \cdot d_{k-1} \mid_{d_k = -d_{k-1}} =$$

$$(p_{1-\delta} - p_{-\delta}) \cdot d_{k-1}^2 + \sum_{j=-\infty, j \neq 0,1}^{\infty} (p_{j-\delta} \cdot d_{k-j} \cdot d_{k-1}) = p_{1-\delta} - p_{-\delta} + \Delta$$

where $r_{k-\delta}$ is the crossing latch sample and $\Delta = \sum_{j=-\infty, j \neq 0,1}^{\infty} (p_{j-\delta} \cdot d_{k-j} \cdot d_{k-1})$.

If the data symbols are independent and identically distributed, the long term average of $r_{k-\delta} \cdot d_{k-1}$ is $p_{1-\delta} - p_{-\delta}$. In addition, $r_{k-\delta} \cdot d_{k-1}$ is symmetric around it, with equal number of values above and below it.

If the crossing latch threshold is 0, the latch output $$x_k \cdot d_{k-1} = \text{sgn}(r_{k-\delta}) \cdot d_{k-1} = \text{sgn}(r_{k-\delta} \cdot d_{k-1}).$$

The long term average of $x_k \cdot d_{k-1}$ is zero if and only if there are equal number of $r_{k-\delta} \cdot d_{k-1}$ above and below 0. When $p_{-\delta} = p_{1-\delta}$, this is true. However, even if $p_{-\delta} \neq p_{1-\delta}$, as long as the two $r_{k-\delta} \cdot d_{k-1}$ values closest to $p_{1-\delta} - p_{-\delta}$ have different polarities, there will still be equal number of $r_{k-\delta} \cdot d_{k-1}$ above and below 0. As a result, bang-bang CDR will settle to a zone centered at $p_{-\delta} = p_{1-\delta}$.

One should note that $p_{-\delta}$ is the sample of the pulse response seen by the crossing latch, not that seen by a data latch if they are different. For baud-rate CDR, using equation (e) and going through a similar analysis, we can express its settling point as $p_{-1} = p_1$.

Once the closed-form expression of the CDR settling point is known, e.g. $p_{-\delta} = p_{1-\delta}$, it is apparent what can be done to influence its settling point. If the IQ offset $\delta$ is changed, the CDR settling point will change as a result.

Figure 6:
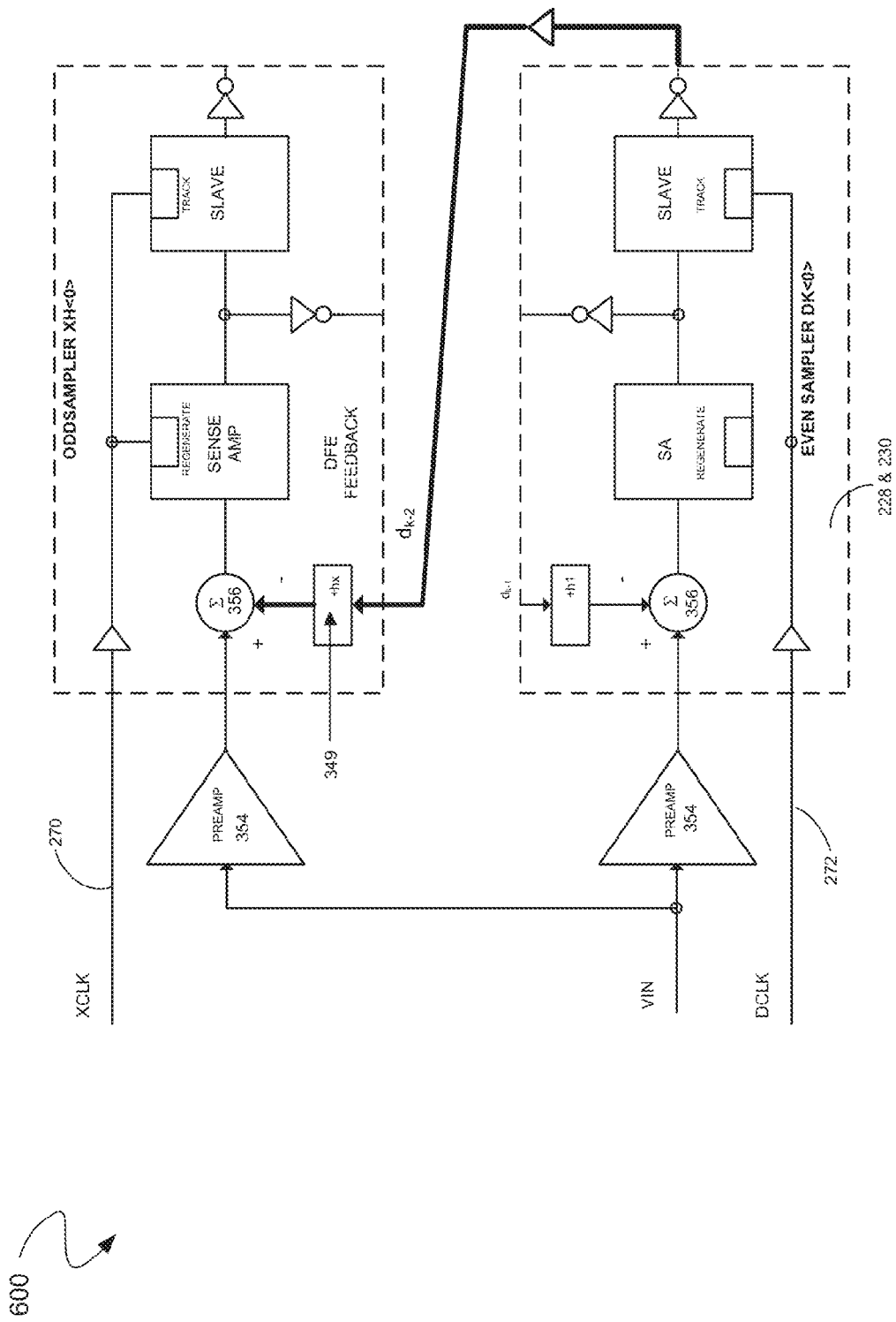
FIG. 6 shows an exemplary circuit employing DFE, in accordance with one embodiment of the present invention, to recover an edge sample signal.

FIG. 6 shows an exemplary circuit 600 employing DFE, in accordance with one embodiment of the present invention on the input signal to arrive at an edge sample signal. Circuit 600 demonstrates an embodiment of implementing the present invention. Circuit 600 includes an odd sampler and an even sampler circuits. More specifically, FIG. 6 illustrates one embodiment of FIG. 3C.

Odd sampler circuit corresponds to circuit 220 of FIG. 2. It receives the X_clock signal 270 and applies DFE techniques to the input signal which is passed through a preamplifier 354. The output of the DFE is then passed to a sense amplifier circuit which is clocked by the X_clock signal 270. The output of the ODD sampler circuit is then the edge sample signal.

The Even Sampler circuit corresponds to branches 228 and 230 of FIG. 2 and receives the d_clock signal 272 and produces the error and data sample signals, 295 and 296 respectively, as described above.

More specifically, the even sampler receives a feedback from a prior data value ($d_{k-1}$) and offsets it by a constant +h1. It is then summed with Vin from a preamp circuit 354 and propagated through the rest of the circuit. Similarly, the even sampler transmits a feedback from a prior data value ($d_{k-2}$) to the odd sampler. The feedback is offset by feedback +hx 349 and summed via a summing node 356 with Vin from a preamp circuit. The even sampler receives DCLK 272 and the odd sampler receives XCLK 270.

Preampliers 354 in FIG. 6 perform a similar function to constant column 354 in FIG. 3C and summing nodes 356 perform a similar function to feedback column 356 in FIG. 3C.

Figure 7:
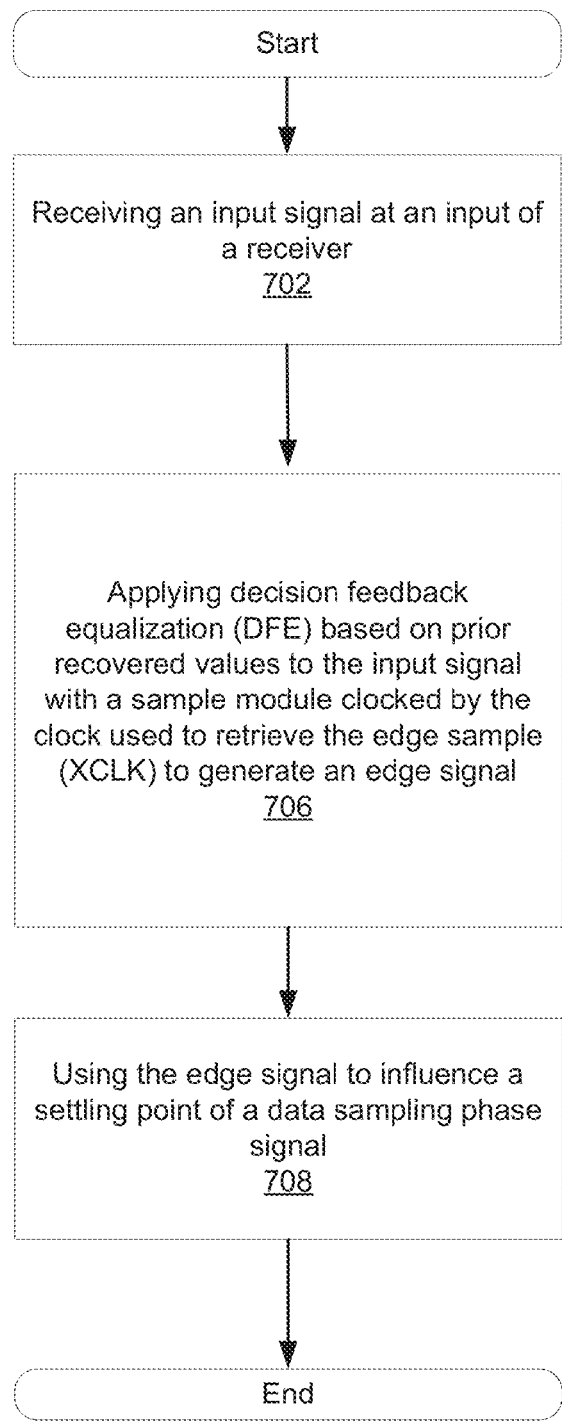
FIG. 7 shows a flowchart of an exemplary computer controlled process employed by a receiver to apply DFE techniques to an input signal for recovery of an edge sample signal that will be used to influence a CDR settling point.

FIG. 7 shows a flowchart of an exemplary receiver implemented process of influencing a CDR settling point by applying DFE techniques to an input signal which produces and edge sample signal, in accordance with one embodiment of the present invention. In block 702, an input signal is received at an input of a receiver. For example, in FIG. 2, the input signal is received at the input of the receiver. Subsequently, CTLE, h2 feedback, and a IIR filter are applied to the signal prior to splitting the signal into a first circuit branch, second circuit branch, and third circuit branch.

In block 706, decision feedback equalization (DFE) is applied to the input signal based on prior recovered data values to generate an output DFE signal. This output DFE signal is then fed to a sampler that is clocked by the x_clock to produce an edge sample signal. For example, in FIG. 2, and in FIG. 6 the DFE circuit blocks apply DFE techniques to the input signal to recover the edge sample signal. The multiplexer selects one out of a plurality of outputs from the DFE block based on a logic function, the output of which is the edge sample signal.

In block 708, the edge sample signal is used to influence a settling point of a data sampling signal. For example, in FIG. 4, the edge sample signal is received by the timing recovery module. The timing recovery module uses a phase detector to generate delta phases based on the edge signal, a current data value, and a prior data value. The loop filter then averages the delta phases to generate a phase code. The phase interpolator uses the phase code and a look-up table to interpolate the phase code and generate a data sampling phase. The data sampling phase eventually settles into a clock and data recovery settling point. Thus, the DFE techniques used to produce the edge sample signal influence the clock and data recovery settling point of the receiver.

In an embodiment, the receiver may also comprise a continuous time linear equalizer (CTLE) is configured to shape an input pulse response to compensate for feedback from the DFE.

While the above discussion focuses on how DFE may be applied to the edge sample signal used by bang-bang CDR to influence the CDR settling point, (also known as the data sampling point), a remaining problem is adapting the DFE tap weight, hx 349 (FIGS. 3B and 3C), automatically for different interfaces or channels. Since, the DFE is applied to the edge sample signal, also known as the "zero crossing" signal, the DFE tap weight may be adapted for different interfaces or channels in order to manipulate the CDR settling point of the data sampling phase signal. The tap weight can be adapted by feeding a data sample signal and an error sample signal derived from the input signal into an adaptation loop that determines the digital code for feeding back into the DFE module.

The tap weights need to be adapted by a computer implemented procedure to the correct value. Tap weights can start at an initial value and be adapted to the correct value by the procedure to accomplish one of the following objectives: (a) reduce precursor ISI; (b) increase vertical eye margin; (c) increase horizontal eye margin; (d) decrease bit error rate (BER); and (e) increase signal to noise ratio (SNR).

The tap weight can be influenced, for example, by the temperature, environment, or characteristics of the link or channel. A longer channel may, for instance, have a different tap weight from a shorter channel. The present invention allows an initial value to be set for the tap weight and then the procedure can adapt the tap weight according to any variation in environment, temperature and characteristics.

Since crossing ISI has impact on the data latch output only via the CDR settling point, simply minimizing the crossing ISI may not be the most optimum solution for adapting the DFE tap weight. Instead the present invention uses crossing ISI cancellation to move the CDR settling point left or right to achieve one of the above mentioned objectives.

Figure 8:
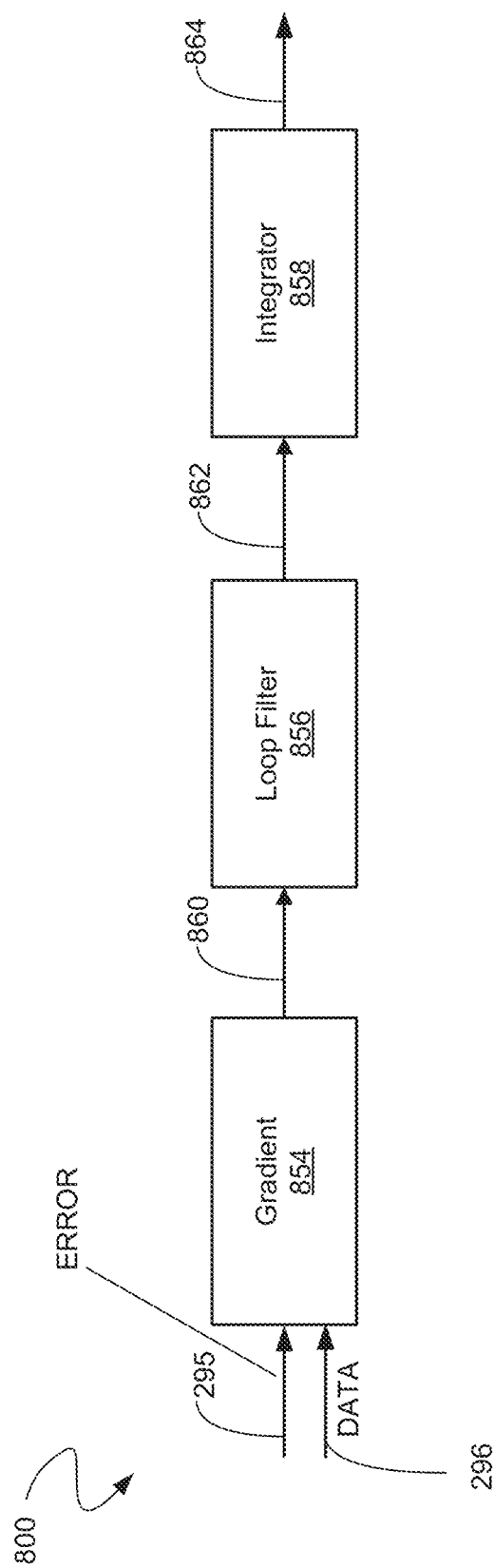
FIG. 8 shows an exemplary high-level block diagram for the adaptation loop module used to determine the DFE tap weight for the feedback block in accordance with one embodiment of the present invention.

FIG. 8 shows an exemplary high-level block diagram for the adaptation loop module used to determine the DFE tap weight for the feedback block in accordance with one embodiment of the present invention. The DFE tap weight can be adapted using the adaptation loop module differently based on the objective.

Adaptation loop 800 is coupled to receiver 200 (FIG. 2) and receives data sample signal 296 and edge sample signal 295 from receiver 200 (FIG. 2). Adaptation loop 800 comprises gradient 854, loop filter 856, and integrator 858.

Gradient 854 receives data sample signal 296 and error sample signal 295 from receiver 200 (FIG. 2). In one embodiment, data sample signal 296 comprises an incoming data value $d_{k+1}$. Gradient 854 operates to generate output 860 which can be based on an incoming future data bit value and an error bit value.

Loop filter 856 is coupled to integrator 858. Loop filter 856 receives input 860 generated by the gradient 854 and averages out the instantaneous variation from signal 860 to generate output 862. Loop filter 856 inherently functions as an adder, accumulator and loop gain control. The function of loop filter 856 is different from the function of loop filter 456.

Integrator 858 is coupled to loop filter 856 and receives the input 860 generated by loop filter 856. The integrator 858 effectively acts as a lookup table. The output 864 of integrator 858 acts as a pointer to a lookup table that, in one embodiment, can provide a 4-bit digital code that is fed back into hx feedback block 349 (FIGS. 3B and 3C) through feedback input 370. As discussed above, the hx feedback 349 is a DFE tap weight that in one embodiment can be adapted automatically for different interfaces or channels. The 4 bit digital code, obtained as a result of doing a look-up in the look-up table (not shown) using output 864 as a pointer, can either increase or decrease until it settles on the final value or dithers betweens two adjacent values. The tap weight will thereafter converge to the appropriate value in accordance with the 4 bit digital code that is input to the hx feedback block 349.

In one embodiment, the DFE tap weights may be adapted such that the CDR settling point will result in a reduced precursor ISI. By way of example, a simple least mean squares (LMS) method can be used in this embodiment to achieve the goal of a reduced precursor ISI. The gradient used to reduce precursor ISI, in one embodiment, is:

$$e_k \cdot d_{k+1}$$

which minimizes the first precursor tap. In one embodiment, when the long term average of the above gradient is 0, the first precursor ISI tap must be zero. Accordingly, to reduce precursor ISI, the above gradient is used as the adaptation procedure to determine hx. It should be noted that this algorithm works best if the CDR sampling point needs to be moved left since the precursor ISI will typically increase when the sampling phase moves right. This corresponds to the case of $h_x < 0$.

FIG. 9 shows an exemplary circuit for implementing the adaptation loop module for the feedback block so that it reduces precursor ISI in accordance with one embodiment of the present invention.

Data sample signal 296 and error sample signal 295 latch into registers 905 and 906 respectively. The gradient module comprises an XOR operation that XORs the future incoming data bit from the data sample signal and the current error bit from the error sample signal. The error signal comprises information regarding the inter-symbol interference. The (K+1)th sample of the data bit is the precursor bit. The XOR of the two signals represents the correlation between the error and the precursor. To reduce precursor ISI, as explained above, the product (or XOR) of the error and precursor bits needs to converge to 0. If the product yields a +1 result, hx needs to be increased. If the product yields a −1 result, hx needs to be decreased. Eventually, the gradient needs to converge to a value of 0, which indicates that the precursor ISI has been reduced and that no further adaptation of tap weight hx needs to take place. The result of the XOR operation is subsequently fed into latch 930.

Loop filter 856 (FIG. 8) comprises an accumulator, which in one embodiment, can be a 4-bit accumulator 940. The outputs of the 4-bit accumulator are fed into an n-bit accumulator through two separate branches, an increment branch and a decrement branch. The n-bit accumulator 950 in conjunction with the 4-bit accumulator 940 operates to average out the instantaneous variation and filter out the noise so that the output of the adaptation loop, Tap 980, does not change with every variation in the output of latch 930. Thus, the output of n-bit accumulator 950 only changes if there is a consistent change to the input of the loop filter module.

The integrator 960 effectively acts as a look-up table. The output of integrator 960 latches into latch 970. Output Tap 980 from latch 970 is a pointer to a lookup table (not shown) that in one embodiment can provide a 4-bit digital code that is fed back into hx feedback block 349 (FIGS. 3B and 3C) through feedback input 370. Until the output of gradient block 854 (FIG. 8) converges to a 0 value, the pointer value obtained from output Tap 980 will continue to adapt by either increasing or decreasing in the appropriate direction. In one embodiment, the computer implemented procedure used by the integrator 960 to adapt to the appropriate tap output is illustrated in block 965. Based on the output from the n-bit accumulator 950 in the loop filter, the output TAP 980 can either be incremented or decremented in the appropriate direction.

Accordingly, the 4-bit digital code being entered into feedback block 349 through input 370 will continue to increment or decrement the tap weight hx. Within feedback block 349 (FIGS. 3B and 3C), there is a digital to analog converter (DAC) that converts the 4-bit digital code from input 370 to an analog voltage value that is used to adjust the DFE tap weight. For example, as shown in FIG. 6, the hx feedback 349 voltage based on the O-bit digital code is summed with Vin from the preamp circuit in the DFE feedback module.

Figures 9A, 9B:
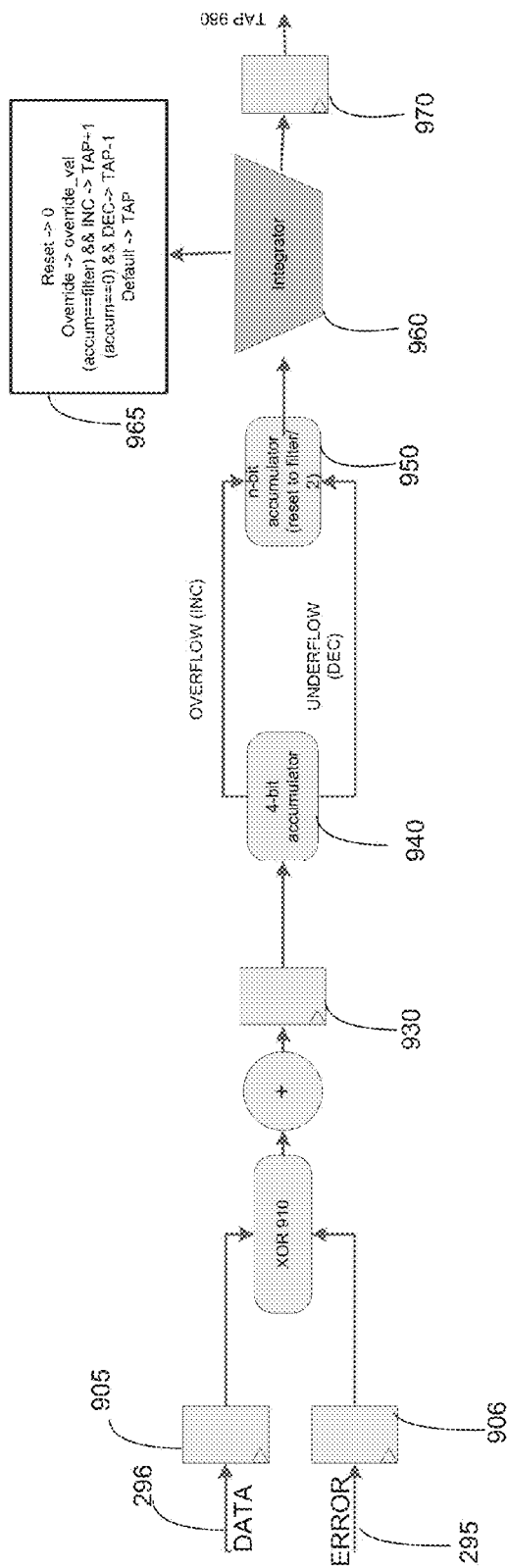
FIGS. 9A and 9B show an exemplary circuit for implementing the adaptation loop module for the feedback block so that it reduces precursor ISI in accordance with one embodiment of the present invention.

In one embodiment, as illustrated in FIG. 9B, the gradient module 910 uses the following gradient: $e_k^* d_{k+i}$. The bandwidth of the tap weight can be between 0.005 and 0.1 MHz and the accumulator size can be 20 in this embodiment.

In other embodiments, the DFE tap weights may be adapted such that the eventual CDR settling point will result in either increased vertical eye margin, increased horizontal eye margin, decreased BER, or increased SNR. In these embodiments, instead of using an adaptation loop 800, different possible values of hx are swept by an adaptation module and the best one is chosen based on the objective. For example, to pick a CDR settling point corresponding to the best vertical eye margin, tap weight hx values can be swept and the resulting CDR settling points can be analyzed to choose the hx value that is associated with the best vertical eye margin. Similar techniques can be used for the other stated objectives, namely, increased horizontal eye margin, decreased BER, or increased SNR. It should be noted that using an adaptation module that sweeps across all possible hx values will take longer than using the adaptation loop 800 that is used in connection with reducing precursor ISI.

Figure 10:
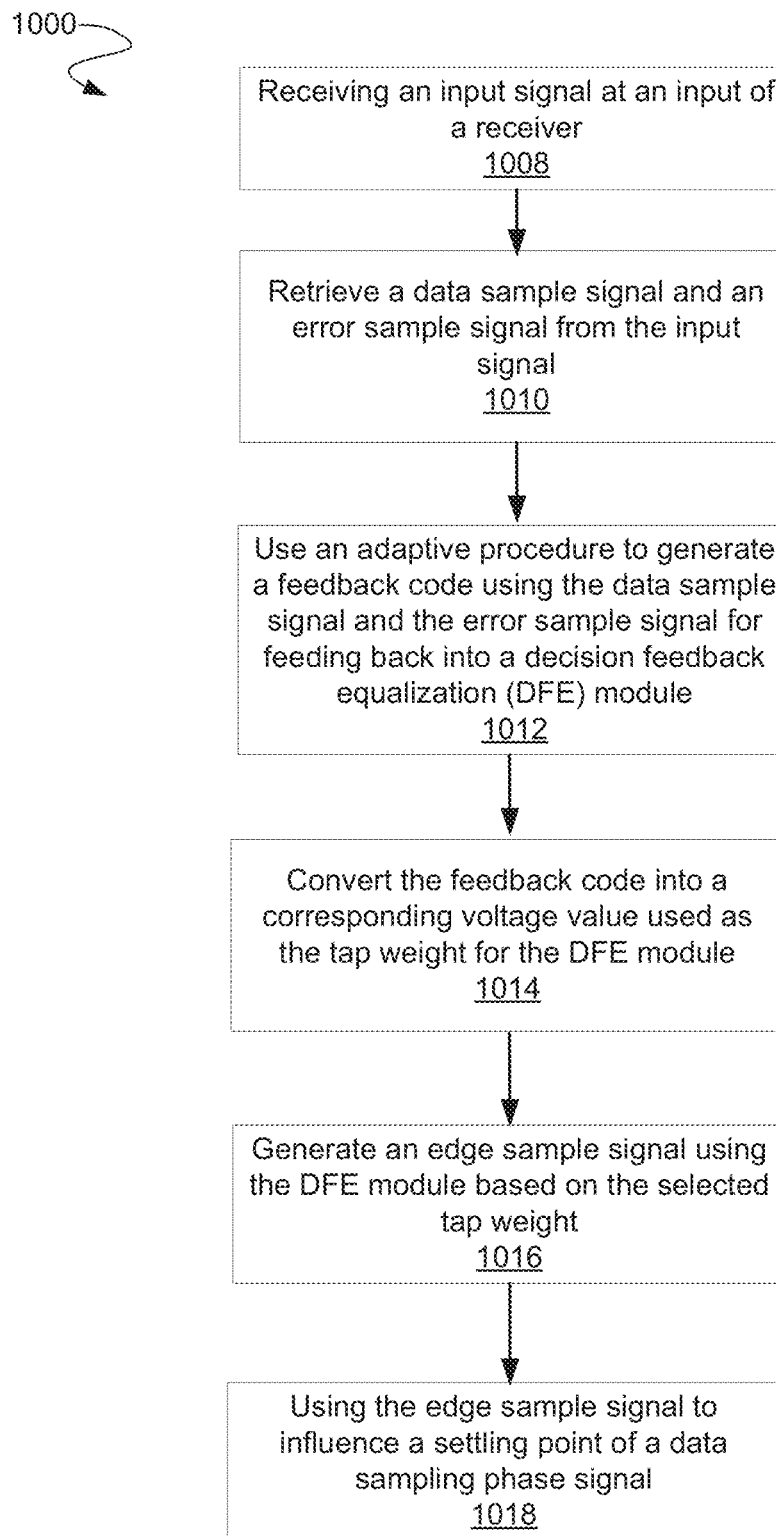
FIG. 10 shows a flowchart of an exemplary electronic process employed by a receiver to adapt the tap weights used in the feedback blocks of the DFE modules in accordance with one embodiment of the present invention.

FIG. 10 shows a flowchart of an exemplary electronic process employed by a receiver to adapt the tap weights used in the feedback blocks of the DFE modules with the goal of reducing precursor ISI in accordance with one embodiment of the present invention.

At step 1008, an input signal is received at an input of a receiver. For example, in FIG. 2, the input signal is received at the input of the receiver 200.

At step 1010, receiver 200 retrieves a data sample signal 296 and an error sample signal 295 from the input signal.

At step 1012, an adaptive procedure, e.g., a least mean squares procedure is used to generate a feedback code using the data sample signal 296 and the error sample signal 295 for feeding back into a DFE module 220. In one embodiment, the code corresponds to a feedback value that reduces precursor ISI. In one embodiment, the feedback code can be a 4-bit digital code.

At step 1014, the feedback code entered through feedback input 370 into hx feedback block 349 (FIGS. 3B and 3C) is converted into a corresponding voltage value. In one embodiment, the 4-bit digital code can be converted into an analog voltage value using a digital to analog converter. This voltage value is used as the tap weight hx for the DFE module.

At step 1016, an edge sample signal 248 is generated using the DFE module based on the selected tap weight hx. At step 1018, the edge sample signal 248 and data sample signal 296 pass through timing recovery module 400 to generate a data sampling phase 464, which eventually settles at a point to become the clock and data recovery settling point (CDR settling point).

Figure 11:
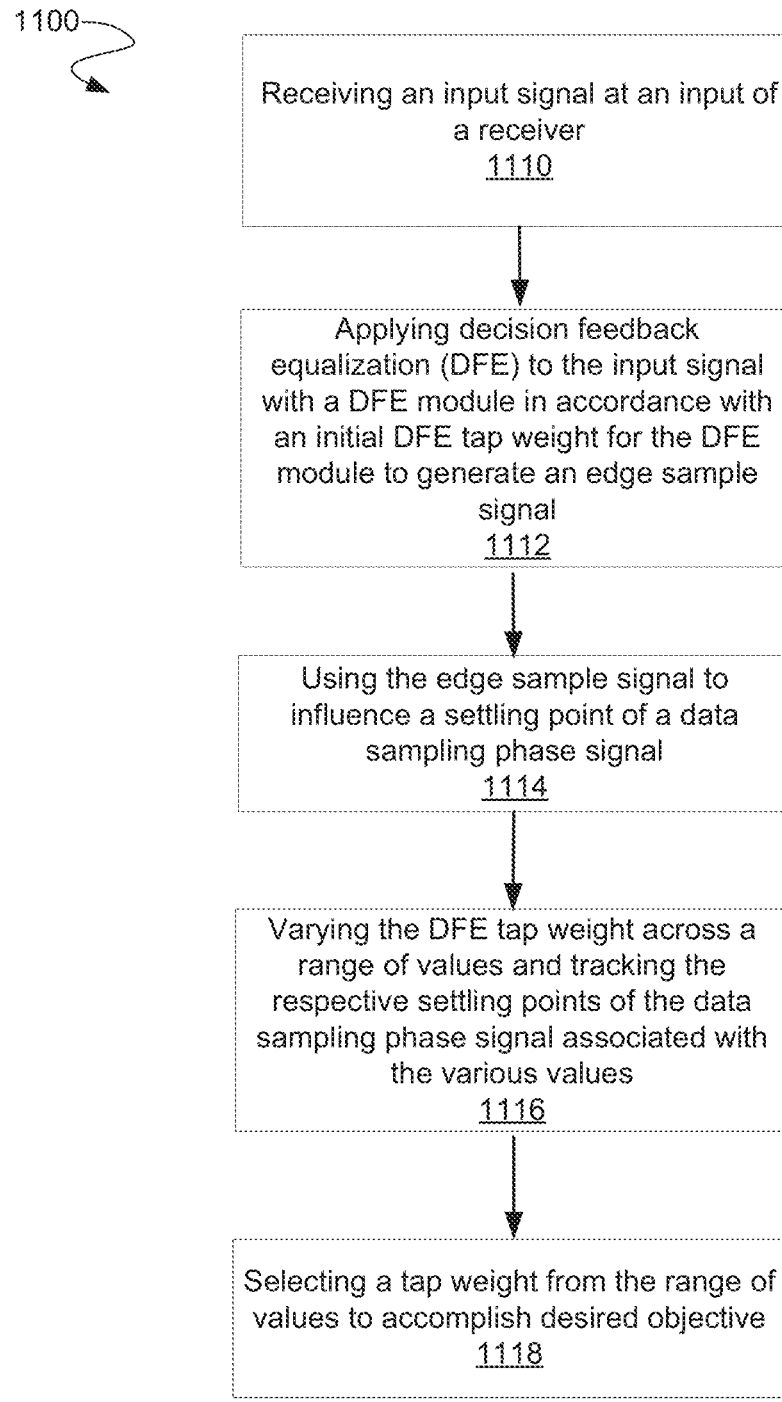
FIG. 11 shows a flowchart of an exemplary electronic process employed by a receiver to adapt the tap weights used in the feedback blocks of the DFE modules with the goal of either increasing vertical eye margin, increasing horizontal eye margin, decreasing BER or increasing SNR in accordance with one embodiment of the present invention.

FIG. 11 shows a flowchart of an exemplary electronic process employed by a receiver to adapt the tap weights used in the feedback blocks of the DFE modules with the goal of either increasing vertical eye margin, increasing horizontal eye margin, decreasing BER or increasing SNR in accordance with one embodiment of the present invention.

At step 1110, an input signal is received at an input of a receiver. For example, in FIG. 2, the input signal is received at the input of the receiver.

At step 1112, DFE is applied to the input signal by DFE module 220 in accordance with an initial tap weight to generate an edge sample signal 248.

At step 1114, the edge sample signal 248 and data sample signal 296 pass through timing recovery module 400 to generate a data sampling phase 464, which eventually settles at a point to become the clock and data recovery settling point (CDR settling point) corresponding to initial tap weight value.

At step 1116, the DFE tap weight hx is varied across a range of values and the respective CDR settling points associated with each value is tracked. At step 1118, a tap weight hx 349 is selected from the range of values swept to accomplish the desired objective. For example, if the goal is to decrease BER, then the tap weight hx 349 that results in the smallest BER can be chosen from the range of values generated.

Figure 12:
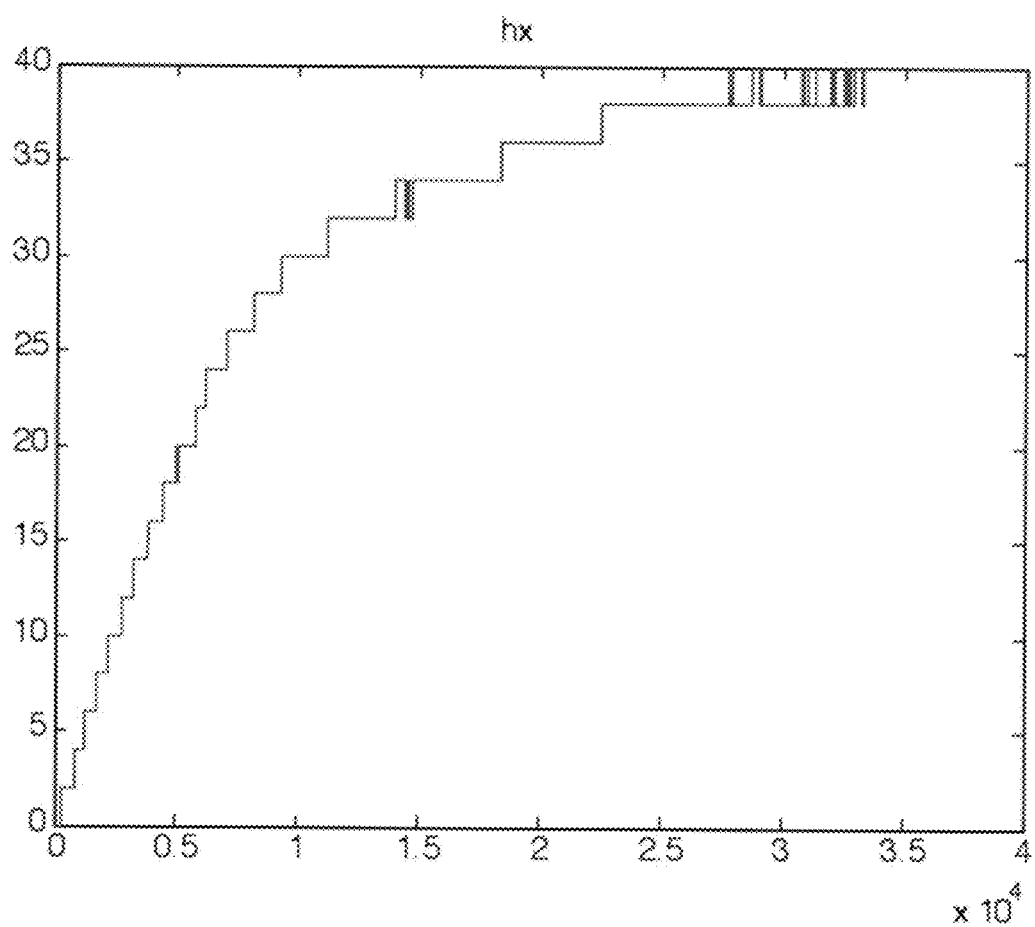
FIG. 12 illustrates an exemplary convergence of the DFE tap weight.

FIG. 12 illustrates an exemplary convergence of the DFE tap weight. As illustrated in FIG. 12, the DFE tap weight, hx, varies until it converges to a final value.

Figure 13:
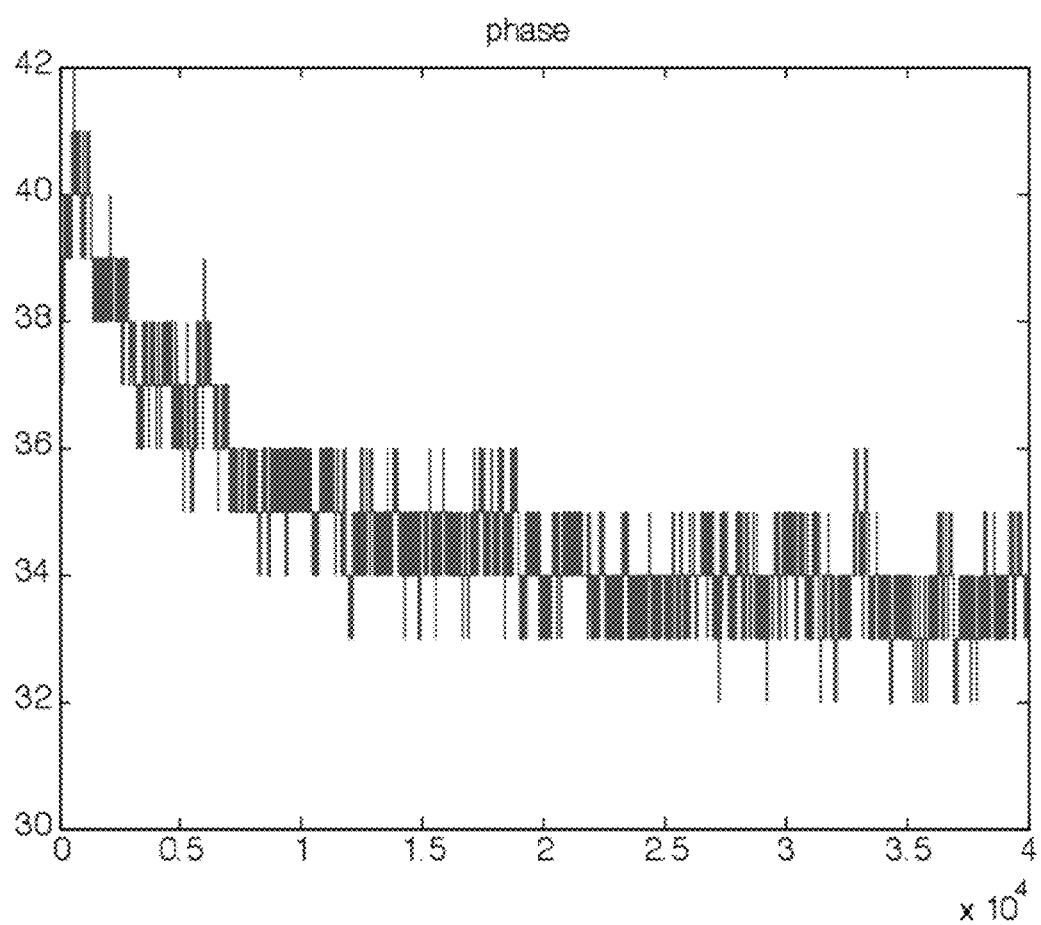
FIG. 13 illustrates how the clock data recovery (CDR) recovery point changes in response to the convergence of the DFE tap weight illustrated in FIG. 12.

FIG. 13 illustrates how the clock data recovery (CDR) recovery point changes in response to the convergence of the DFE tap weight illustrated in FIG. 12. In response to the DFE tap weight varying while converging to a final value, the CDR recovery point also changes until it also converges to a final value.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

In an embodiment, the zero crossing signal may be offset by a predetermined constant.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
   a first module coupled to an input signal and operable to generate an edge signal using a first clock signal, wherein said first module is a decision feedback equalizer; and
   a second module operable to receive said edge signal and further operable to generate a data sampling phase signal, wherein a parameter of said first module is operable to be adapted, and wherein said parameter is further operable to influence a settling point of said data sampling phase signal.

2. The apparatus of claim 1 further comprising:
   a third module operable to generate a data sample signal using a second clock signal; and
   a fourth module operable to generate an error sample signal using a third clock signal, wherein said parameter is operable to be adapted based on said data sample signal and said error sample signal.

3. The apparatus of claim 2 wherein said first module further comprises:
   a first path coupled to said input signal, said first path comprising:
      a first preamplifier;
      a first summing node coupled to said first preamplifier; and
      a first latch coupled to said first summing node and said first clock signal;
   a second path coupled to said input signal, said second path comprises:
      a second preamplifier;
      a second summing node coupled to said second preamplifier and operable to apply feedback to its input signal based on a previously generated data sample, wherein said parameter is operable to be a tap weight of said feedback applied to said input signal of said second summing node; and
      a second latch coupled to said second summing node; and
   a multiplexer coupled to said first latch and said second latch, said multiplexer operable to select an output between said first latch and said second latch based on an exclusive OR of a first and a second previously generated data samples.

4. The apparatus of claim 2 wherein said first module further comprises:
   a first path coupled to said input signal, said first path comprising:
      a first preamplifier;
      a first summing node coupled to said first preamplifier and operable to apply a first feedback to its input signal based on a previously generated data sample, wherein a first parameter of said first module is operable to be a tap weight of said first feedback applied to said input signal of said first summing node, wherein said first parameter is operable to be adapted based on said data sample signal and said error sample signal; and
      a first latch coupled to said first summing node;
   a second path coupled to said input signal, said second path comprising:
      a second preamplifier;
      a second summing node coupled to said second preamplifier and operable to apply a second feedback to its input signal based on a previously generated data sample, wherein a second parameter of said first module is operable to be a tap weight of said second feedback applied to said input signal of said second summing node, wherein said second parameter is operable to be adapted based on said data sample signal and said error sample signal; and
      a second latch coupled to said second summing node; and
   a multiplexer coupled to said first latch and said second latch, said multiplexer operable to select an output between said first latch and said second latch based on an exclusive OR of a first and a second previously generated data samples.

5. The apparatus of claim 4, wherein a magnitude of said first parameter is equal to a magnitude of said second parameter.

6. The apparatus of claim 2 wherein said first module further comprises:
   a first path coupled to said input signal, said first path comprising:
      a first preamplifier operable to offset said input signal by a value of a third parameter of said first module, wherein said third parameter is operable to be adapted based on said data sample signal and said error sample signal;
      a first summing node coupled to said first preamplifier; and
      a first latch coupled to said summing node;
   a second path coupled to said input signal, said second path comprising:
      a second preamplifier operable to offset said input signal by a value of a fourth parameter of said first module, wherein said fourth parameter is operable to be adapted based on said data sample signal and said error sample signal;
      a second summing node coupled to said second preamplifier;
      a second latch coupled to said second summing node; and
      a multiplexer coupled to said first latch and said second latch, said multiplexer operable to select between an output of said first latch and said second latch based on a previously generated data sample.

7. The apparatus of claim 6, wherein a magnitude of said third parameter is equal to a magnitude of said fourth parameter.

8. The apparatus of claim 2, wherein an adaptation module for said parameter comprises:
   a gradient module operable to generate a gradient of said parameter based on said data sample signal and said error sample signal;
   a first loop filter operable to adjust a speed of convergence by scaling said gradient with a predefined gain to generate an output signal;
   an integrator operable to integrate said output signal to generate a code for said parameter; and
   a digital to analog converter operable to convert said code into a corresponding voltage value.

9. The apparatus of claim 1, wherein said parameter is operable to be adapted towards a goal, wherein said goal is selected from a group consisting of: minimizing a precursor ISI, maximizing vertical eye margin, minimizing horizontal eye margin, minimizing bit error rate, and maximizing signal to noise ratio.

10. The apparatus of claim 1 wherein said second module comprises:
   a phase detector operable to receive said edge sample signal and generate a plurality of delta phases therefrom;
   a second loop filter coupled to said phase detector operable to average said plurality of delta phases and generate a phase code; and
   a phase interpolator coupled to said loop filter operable to generate said data sampling phase based upon said phase code.

11. An apparatus for arriving at a clock and data recovery settling point of a data sampling phase signal, said apparatus comprising:
   a receiving module coupled to receive an input signal and operable to employ decision feedback equalization (DFE) on the input signal and operable to generate an edge sample signal therefrom using a first clock signal; and
   a timing recovery module coupled to said receiving module and operable to receive said edge sample signal and generate a data sampling phase signal based on said edge sample signal, wherein a parameter of said DFE is operable to be adapted towards a goal, and further wherein said DFE influences a settling point of said data sampling phase signal.

12. The apparatus of claim 11 wherein said receiving module comprises:
   a first branch operable to apply DFE to said input signal to generate said edge sample signal using said first clock signal;
   a second branch operable to generate an error sample signal using a second clock signal; and
   a third branch operable to generate a data sample signal using a third clock signal, wherein said parameter is adapted based on said data sample signal and said error sample signal.

13. The apparatus of claim 12, wherein an adaptation module operable to adapt said parameter comprises:
   a gradient module operable to generate a gradient of said parameter based on said data sample signal and said error sample signal;
   a loop filter operable to adjust a speed of convergence by scaling said gradient with a predefined gain to generate an output signal;
   an integrator operable to integrate said output signal to generate a code for said parameter; and
   a digital to analog converter operable to convert said code into a corresponding voltage value.

14. The apparatus of claim 11, wherein said goal is selected from a group consisting of: minimizing a precursor ISI, maximizing vertical eye margin, minimizing horizontal eye margin, minimizing bit error rate, and maximizing signal to noise ratio.

15. A method comprising:
   receiving an input signal at an input of a receiving module;
   applying decision feedback equalization (DFE) to said input signal based on prior recovered data values to generate an output DFE signal;
   using a sampler module clocked by an X clock signal, sampling said output DFE signal to generate an edge sample signal; and
   using said edge sample signal to influence a settling point of a data sampling phase signal, wherein a parameter of said DFE is operable to be adapted towards a goal, and further wherein said DFE further influences a settling point of said data sampling phase signal.

16. The method of claim 15, wherein said parameter is adapted based on a data sample signal and an error sample signal derived from said input signal.

17. The method of claim 16, wherein an adaptation of said parameter comprises:
   generating a gradient of said parameter based on said data sample signal and said error sample signal;
   adjusting a speed of convergence by scaling said gradient with a predefined gain to generate an output signal;
   integrating said output signal to generate a code for said parameter; and
   converting said code into a corresponding voltage value.

18. A circuit comprising:
   a decision feedback equalization (DFE) module operable to receive an input signal and further operable to employ DFE on said input signal to generate an edge sample signal therefrom, wherein said DFE is based on an initial tap weight for said DFE module;
   a timing recovery module coupled to said DFE module and operable to receive said edge sample signal, and further operable to generate a data sampling phase signal based on said edge sample signal, wherein said data sampling phase signal converges to a clock and data recovery (CDR) settling point; and
   an adaptation module operable to vary a DFE tap weight from said initial tap weight value across a range of values and tracking respective CDR settling points associated with said range of values and further operable to select a value for said DFE tap weight from said range of values.

19. The circuit of claim 18, wherein a CDR settling point corresponding to said value selected for said DFE tap weight results in a higher vertical eye margin as compared to a CDR settling point corresponding to said initial tap weight value.

20. The circuit of claim 18, wherein a CDR settling point corresponding to said value selected for said DFE tap weight results in a higher horizontal eye margin as compared to a CDR settling point corresponding to said initial tap weight value.

21. The circuit of claim 18, wherein a CDR settling point corresponding to said value selected for said DFE tap weight results in a lower bit error rate as compared to a CDR settling point corresponding to said initial tap weight value.

22. The circuit of claim 18, wherein a CDR settling point corresponding to said value selected for said DFE tap weight results in a higher signal to noise ratio as compared to a CDR settling point corresponding to said initial tap weight value.

23. The circuit of claim 18, wherein said adaptation module comprises a gradient module, loop filter module and an integrator module.

* * * * *